US009067353B2

(12) United States Patent
Coldre et al.

(10) Patent No.: US 9,067,353 B2
(45) Date of Patent: Jun. 30, 2015

(54) OPENING LEAF UPPER MODULE FOR A VEHICLE GLASS PANEL

(75) Inventors: Laurent Coldre, La Neuville sur Essonne (FR); Olivier Laude, Amilly (FR); Jean-Pierre Ciolczyk, Montargis (FR)

(73) Assignee: Hutchinson, Paris (FR)

(*) Notice: Subject to any disclaimer, the term of this patent is extended or adjusted under 35 U.S.C. 154(b) by 62 days.

(21) Appl. No.: 13/466,761

(22) Filed: May 8, 2012

(65) Prior Publication Data

US 2012/0216461 A1 Aug. 30, 2012

Related U.S. Application Data

(62) Division of application No. 12/196,448, filed on Aug. 22, 2008, now Pat. No. 8,192,671.

(30) Foreign Application Priority Data

Aug. 24, 2007 (FR) ..................................... 07 06003

(51) Int. Cl.

| | |
|---|---|
| ***B60J 5/04*** | (2006.01) |
| ***B29C 45/16*** | (2006.01) |
| ***B62D 65/08*** | (2006.01) |
| ***B60J 10/08*** | (2006.01) |
| *B29C 45/17* | (2006.01) |
| *B29L 12/00* | (2006.01) |

(Continued)

(52) U.S. Cl.

CPC ........... *B29C 45/1676* (2013.01); *B60J 5/0406* (2013.01); *B60J 5/0481* (2013.01); *B60J 10/0088* (2013.01); *B60J 10/08* (2013.01); *Y10T 29/49* (2015.01); *B29C 45/1704* (2013.01); *B29L 2012/00* (2013.01); *B29L 2031/26* (2013.01); *B29L 2031/30* (2013.01)

(58) Field of Classification Search

CPC ... B29C 45/1676; B60J 5/0406; B60J 5/0481; B60J 10/08; B60J 10/0088

USPC ............................ 49/212, 213, 440, 441, 502

See application file for complete search history.

(56) References Cited

U.S. PATENT DOCUMENTS 4,457,109 A 7/1984 Royse
4,457,111 A * 7/1984 Koike ............................ 49/441

(Continued)

FOREIGN PATENT DOCUMENTS

GB 2272469 A 5/1994
WO WO 2006/128646 A2 12/2006

*Primary Examiner* — Jerry Redman
(74) *Attorney, Agent, or Firm* — Alston & Bird LLP

(57) ABSTRACT

The present invention relates to an opening leaf upper module of this type particularly comprising a rigid frame and a flexible weather strip. The method of manufacturing an opening leaf upper module according to the invention, comprising a molded frame based on at least one thermoplastic polymer and a molded weather strip secured to the frame and based on at least one elastomer, comprises a step whereby a moving-platen mold or alternatively transfer molding is used to perform multiple-shot injection molding of materials that are intended to form the frame and the strip which are injected in succession, the elastomer being a thermoplastic elastomer compatible with this thermoplastic polymer, so as to obtain the module formed as a single piece. For preference, the strip comprises a continuous wiping lip for wiping the glass panel and an interface lip for interfacing with the bodywork of the vehicle, and the frame has a longitudinal hollow.

10 Claims, 2 Drawing Sheets

(51) Int. Cl.

*B29L 31/26* (2006.01)
*B29L 31/30* (2006.01)

(56) References Cited

U.S. PATENT DOCUMENTS 4,483,100 A * 11/1984 Blankenburg et al. .......... 49/352
4,490,942 A * 1/1985 Arnheim et al. ................ 49/374
4,567,691 A * 2/1986 Warner ........................... 49/374
4,571,886 A * 2/1986 Shiraishi ......................... 49/374
4,604,830 A * 8/1986 Maeda et al. ................... 49/374
4,608,779 A * 9/1986 Maeda et al. ................... 49/374
4,653,230 A * 3/1987 Seo et al. ........................ 49/502
4,662,113 A * 5/1987 Weaver ........................... 49/404
4,731,951 A * 3/1988 Ikuta et al. ...................... 49/374
4,762,481 A * 8/1988 Weaver ......................... 425/116
4,823,511 A * 4/1989 Herliczek et al. ............... 49/404
4,834,931 A * 5/1989 Weaver ......................... 264/252
4,874,201 A * 10/1989 Scaglietti ...................... 296/201
4,875,307 A * 10/1989 Barbero .......................... 49/374
4,932,161 A * 6/1990 Keys et al. ................... 49/490.1
4,988,142 A * 1/1991 Chandler et al. ........... 296/146.2
5,054,242 A * 10/1991 Keys et al. ................... 49/490.1
5,086,586 A * 2/1992 Hlavaty et al. .................. 49/211
5,086,589 A * 2/1992 dibenedetto .................... 49/502
5,613,325 A * 3/1997 Mariel ............................ 49/404
5,732,509 A * 3/1998 Buehler et al. .................. 49/440
5,846,463 A 12/1998 Keeney et al.
6,141,910 A * 11/2000 Kobrehel et al. ............... 49/378
6,536,832 B1 * 3/2003 Grimm et al. .............. 296/146.6
6,572,176 B2 * 6/2003 Davis et al. .............. 296/146.16
6,880,293 B2 * 4/2005 Ishikawa et al. ................ 49/414
7,086,201 B2 * 8/2006 Struyven et al. ................ 49/502
7,624,537 B2 * 12/2009 Moreau ........................... 49/212
8,561,354 B2 * 10/2013 Grudzinski et al. ............ 49/502
2008/0224501 A1 * 9/2008 Zimmer et al. ............... 296/201
2009/0113802 A1 * 5/2009 Cicala ............................. 49/358
2009/0265999 A1 10/2009 Stefanelli

* cited by examiner

OPENING LEAF UPPER MODULE FOR A VEHICLE GLASS PANEL

CROSS REFERENCE TO RELATED APPLICATION

This application is a divisional application of application Ser. No. 12/196,448, filed Aug. 22, 2008, now U.S. Pat. No. 8,192,671, which claims priority from French Application No. 07 06003, filed Aug. 24, 2007.

FIELD OF THE INVENTION

The present invention relates to a method of manufacturing an opening leaf upper module intended to be mounted at the periphery of a glass panel of a vehicle, and to an opening leaf upper module of this type comprising in particular a rigid frame and a flexible weather strip. The invention applies in particular to an opening leaf for the sliding side window glass panel of a motor vehicle although it may just as easily be applied to other types of opening leaf such as those used in the fields of aeronautical, rail or naval engineering.

BACKGROUND OF THE INVENTION

As is known, opening leaf modules, particularly for motor vehicles, consist of a heterogeneous collection of a great many parts with different functions, sizes and materials, thus requiring a great many operations to manufacture and assemble these modules. Motor vehicle side door opening leaf modules can be broken down into two sub-modules which are separated from one another by the line known as the waistline of the bodywork which can typically be seen running approximately along the horizontal glass panel wiping lips and which comprise two opening leaf modules, the upper and lower modules respectively.

With regard to the opening leaf upper module, this generally comprises a rigid door frame, usually made of metal, on which there is mounted a flexible strip that weatherproofs and guides the moving glass panel and is made of an elastomeric material that may or may not have a reinforcing member. A door frame of this type may, for example, be produced by assembling pressed sheet, metal section pieces that have been extruded and deformed by mechanical action (e.g. by bending, curving or hydroforming) or alternatively of injection-molded or cast metal components. These frames in particular have the disadvantage of being manufactured independently of the corresponding sealing/guiding strips, which means that a relatively high number of operations need to be performed in order to manufacture the corresponding upper modules, thus leading to a build-up of dimensional spread on the end-product.

Document GB-A-2 272 469 introduces an opening leaf upper module for a motor vehicle side door, the rigid frame of which is not made of metal but is molded in a thermoplastic material, and the rubber weather strip and guide of which is secured to this frame by overmolding of the molded frame previously coated with an adhesion promoter that encourages the rubber of the strip to stick, in an injection molding machine that vulcanizes this rubber following this overmolding.

One major disadvantage with the manufacturing method described in that document lies in the need to perform two successive steps: molding the frame and overmolding with vulcanization, thus leading to a relatively high cost of manufacture. Another disadvantage with this method lies in the need to use an adhesion promoter to encourage the strip to stick to the frame.

SUMMARY OF THE INVENTION

It is an object of the present invention to propose a method of manufacturing an opening leaf upper module intended to be mounted around the periphery of a glass panel of a vehicle, particularly a sliding side window glass panel of a motor vehicle, this module comprising a molded frame based on at least one thermoplastic polymer and a molded weather strip secured to said frame and based on at least one elastomer, which is able to remedy the aforementioned disadvantages.

To this end, an opening leaf upper module according to the invention comprises a molding step performed by multiple-shot injection molding in a moving-platen mold, for example a sliding-platen mold, or alternatively implemented using transfer molding, of materials intended to form said frame and said strip which are injected in turn, said elastomer being a thermoplastic elastomer (TPE) compatible with said thermoplastic polymer, so as to obtain this module formed as a single piece.

The expression “multiple-shot injection molding” should be understood in the present description to mean, in the known way, the successive injection, into distinct cavities, of plastics or materials that can be used as plastics. Mention is thus made of two-shot or three-shot injection molding where two or three of such materials are injected in succession.

It will be noticed that this one-piece module according to the invention has the advantage that it can be produced in a single multiple-shot injection molding step without the need to use an adhesion promoter at the interface between the frame and the strip and especially without any additional step of vulcanizing the elastomer strip, unlike the case in the aforementioned document GB-A-2 272 469, this representing a substantial reduction in the number of parts and manufacturing operations required and therefore in the overall cost of manufacturing and assembling the module.

Advantageously, this module may be designed to receive the glass panel such that it can move in said frame, and it is then such that said strip comprises a wiping lip that wipes the glass panel and an interface lip that interfaces with the bodywork of the vehicle to seal the opening leaf with respect to this bodywork. This strip is thus a weatherproofing and guide strip.

As a preference, said frame is based on an alloy of polyesters, such as an alloy of polyethylene terephthalate (PET) with polybutylene terephthalate, (PBT) and the thermoplastic elastomer used for the weather strip/guide strip is chosen from the group consisting of thermoplastic vulcanizates (TPV) and of styrene block copolymers (TPS).

By way of an even greater preference, said strip may be based on a thermoplastic vulcanizate (TPV) comprising a blend:

- of a polymerized elastomer which is synthesized using a metallocene catalyst and which belongs to the group consisting of ethylene/propylene/diene terpolymers (EPDM) and polyoctenes, and
- of a graft polyolefin, such as a polypropylene.

As an alternative, the sealing (weather) strip/guide strip may be based on a styrene block copolymer (TPS) which is, for example, of the styrene/butadiene/styrene (SBS) or ethylene/butylene/styrene (SEBS) block copolymer type.

It will be noted that said strip may possibly further comprise at least one compatibilizing agent (in addition to the other ingredients customarily used in sealing strips such as fillers, plasticizers, etc.) to encourage it to stick to said frame without the need for a bonding interface layer.

According to a preferred embodiment of the invention, immediately after injecting the thermoplastic material that is intended to form the frame, this injected frame is hollowed out over its entire length by injecting through it liquid water or a gas under pressure and at a temperature lower than the temperature at which the material of the frame was injected, so as to form a hollow at its center by peripherally compacting this material.

It will be noted that this hollowing of the frame combined with the sufficiently rigid thermoplastic material of which it is made allows its rigidity/weight ratio to be improved considerably (i.e. allows its weight to be minimized for a given rigidity), while at the same time reducing the amount of thermoplastic material injected in order to produce the frame.

It should also be noted that this making of the thus hollowed one-piece frame by molding is advantageously performed in a very short space of time and at a temperature very much lower than the vulcanization temperature used in document GB-A-2 272 469.

According to another feature of the invention, said frame essentially has two substantially vertical portions, a front one and a rear one, which are connected to one another by a substantially horizontal upper portion and between which portions the glass panel is mounted so that it can slide toward or away from said upper portion, and the multiple-shot injection molding step may advantageously comprise the formation of a glass panel guide track sliding in each of said front and rear portions, and, following this molding step, glass panel guide means which are fixed to an interior face of this glass panel are then inserted into these tracks and mounted such that they can slide in the corresponding track so as to provide axially offset guidance for the glass panel as it slides in said frame.

The expression "axially offset guidance" in this description means an offset in the widthwise direction Y of the vehicle (i.e. at right angles to the plane of the glass panel with which the corresponding side door of the vehicle is fitted).

With this offset guidance of the glass panel according to this embodiment of the invention, it will be noted that it is not the wiping lip that guides the glass panel as it slides in the door frame, as described in document GB-A-2 272 469 and as in the case of conventional window run seals, but it is the said guide means attached, such that they can move, to this frame that provides this guidance, as will be explained in greater detail hereinafter.

According to another feature of the invention, the method of manufacturing this opening leaf upper module may further comprise connecting this module to a lower module of this opening leaf that is intended to lie below the glass panel, for example by having beforehand overmolded metal inserts of which this lower module is formed with the injected materials of said frame and of said strip that are intended to form this upper module.

An opening leaf upper module according to the invention, which is intended to be mounted at the periphery of a glass panel of a vehicle, particularly a sliding side window glass panel of a motor vehicle, comprises a molded frame based on at least one thermoplastic polymer and a molded weather strip secured to this frame and based on at least one elastomer.

According to the invention, this module is molded by multiple-shot injection molding of materials of which said frame and said strip are formed, in which this elastomer is a thermoplastic elastomer (TPE) compatible with this thermoplastic polymer, so as to obtain this module formed as a single piece, and without any adhesive interface layer.

As mentioned hereinabove, this opening leaf upper module is advantageously designed to accept the glass panel such that it can move in the frame, the strip then comprising a continuous wiping lip for wiping the glass panel—this lip acting as a wiper around the entire periphery of the module—and a sealing lip that seals against the bodywork of the vehicle, and this frame preferably has a longitudinal hollow giving it a hollow structure over its entire length.

According to another feature of the invention, said weather strip advantageously has no reinforcing member.

It will be noted that the end-product consisting of the opening leaf upper module according to the invention is advantageously 100% recycleable unlike that of the aforementioned document GB-A-2 272 469 that has to have its materials mechanically separated.

According to another feature of the invention set out hereinabove in conjunction with the method of manufacture of the opening leaf upper module, in which this module incorporates the glass panel and in which the frame has said front and rear portions joined together by said upper portion and between which the glass panel is mounted such that it can slide, a glass panel guide track may be formed in each of these front and rear portions, and glass panel guide means fixed to an interior face of this glass panel are then mounted such that they can slide in each of these tracks in order to provide axially offset guidance of the glass panel in the frame.

Advantageously, each guide track may have a U-shaped cross section, these offset-guidance means comprising shoes of substantially inverted U-shaped cross section with one branch slideably mounted in the corresponding track and the other branch bonded via its external face to the glass panel.

During the step of molding the module, two offset-guidance tracks for guiding the glass panel are thus formed in the respective two front and rear portions of the frame.

According to another particularly advantageous feature of the invention, these tracks and these offset-guidance means are designed in such a way that the glass panel when sliding towards said upper portion of the frame does not come into contact with said wiping lip until it comes into the immediate vicinity of this upper portion or butts against the latter at the end of sliding.

It is essential to note here that the offset guidance of the glass panel according to the invention that is afforded by these tracks and these guide means is able satisfactorily to overcome the following disadvantages relating to the linear guidance of glass panels in the frames of existing upper modules (for example using through-pins or rails) and which result in the continuous and constant sliding of the glass panel against the sealing weather strip as this glass panel moves from the lowered position to the up position adjacent to the upper portion of the frame, namely:

high sliding forces, premature abrading of the weather strip, a not insignificant amount of noise during the procedure, and a limit to the extent to which the glass panel can be "non-flush".

It will thus be noted that this offset guidance via the guide tracks formed on the frame according to the invention makes it possible to minimize the resistance to abrasion of the wiping lip of the weather strip secured to this frame, to simplify the operation of sliding the glass panel and improve the operator comfort inherent to this operation.

According to another advantageous feature of the invention, said frame is entirely fitted from one and the same side of the glass panel that corresponds to the inside thereof so that this frame cannot be seen from the outside of the vehicle equipped with this module according to the invention.

The fact that this frame is hidden from view enhances the external appearance of the motor vehicle fitted with such opening leaf upper modules.

According to another feature of the invention, the glass panel may be mounted so that it can pivot about a longitudinal axis of the opening leaf, the lower base of this glass panel being provided with a connecting system for connection to a glass panel lifter device comprising two superposed mechanical links joined together by a flexible articulation.

It will be noted that this pivoting mounting of the lower base of the glass panel allows the glass panel lifter/glass panel pairing to be given enough rigidity and also plays a part in the non-linear guidance of the glass panel according to the invention so that this glass panel does not come into contact with the wiping lip as it slides towards the upper portion of the frame until it comes into the immediate vicinity of or into contact with this portion.

BRIEF DESCRIPTION OF THE DRAWINGS

Other features, advantages and details of the present invention will emerge from reading the following description of a number of embodiments of the invention which are given by way of non-limiting illustration, said description being given with reference to the attached drawings, among which.

DETAILED DESCRIPTION

Figure 1:
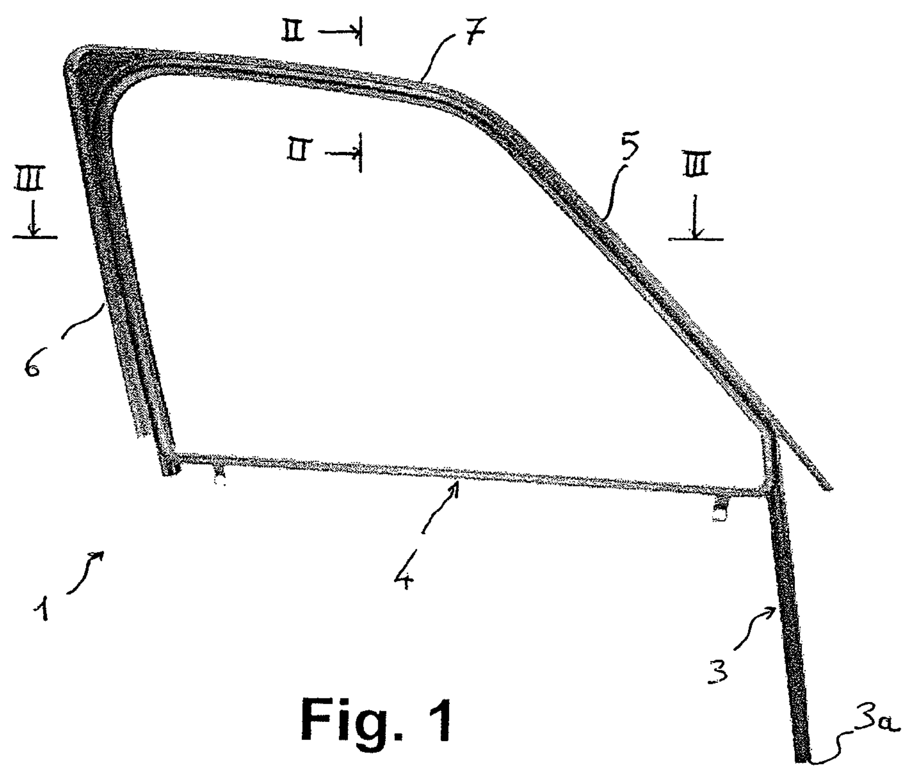
FIG. 1 is a perspective view of a side opening leaf upper module according to the invention for a motor vehicle which is designed to accept a sliding glass panel.
Figure 2:
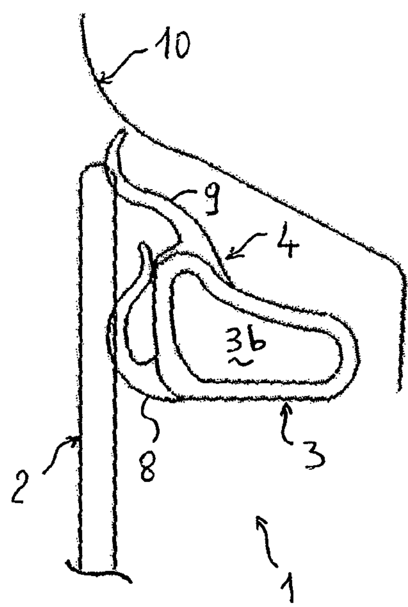
FIG. 2 is a schematic view in cross section on the plane II-II of FIG. 1, and according to a preferred embodiment of the invention, of the upper portion of this module equipped with the corresponding glass panel in a position in which the opening leaf is mounted against the bodywork of the vehicle.
Figure 3:
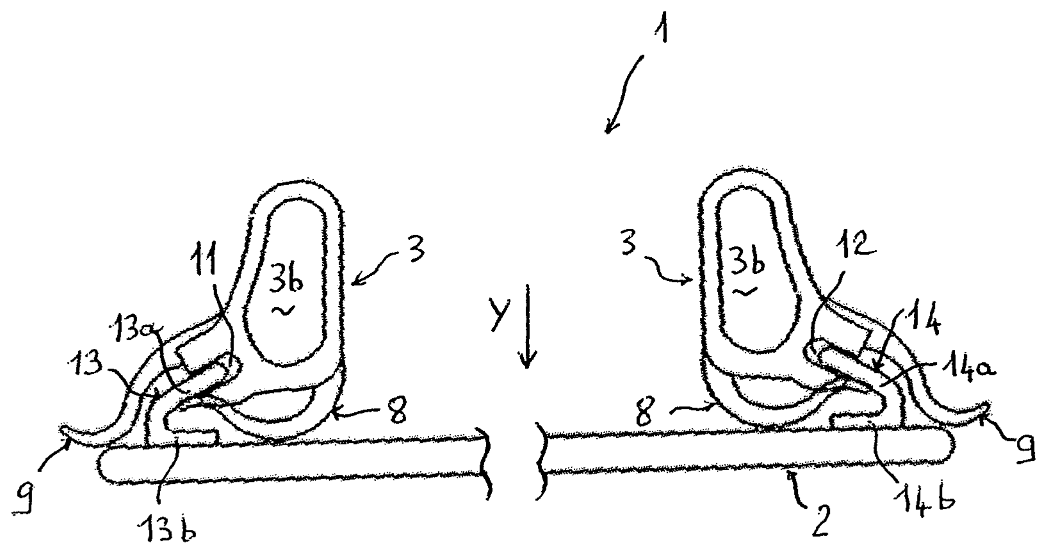
FIG. 3 is a schematic part view in cross section on the plan of FIG. 1 and according to a preferred embodiment of the invention, of the two, front and rear, portions of this module equipped with the corresponding glass panel.
Figure 4:
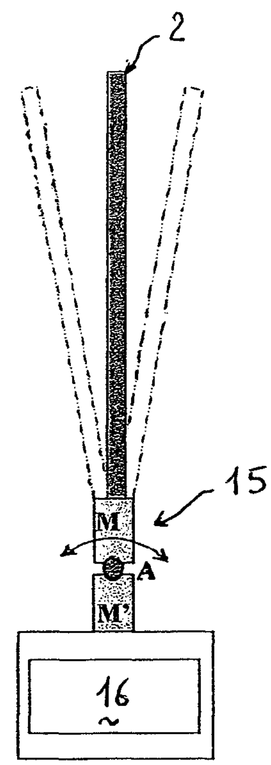
FIG. 4 is a schematic functional diagram, in axial section, of the main parts of a glass panel lifter device connected to an articulated system according to the invention for pivoting the glass panel about a longitudinal axis parallel to its lower base.

The opening leaf upper module 1 according to the invention and which is illustrated in FIG. 1, is designed to be mounted at the periphery of a motor vehicle sliding side glass panel 2 (this glass panel 2 can be seen in FIGS. 2 to 4). The module 1 comprises a molded rigid frame 3 based on a thermoplastic polymer such as a PET-PBT alloy, and a flexible molded sealing weather strip/glass panel guide strip 4 for sealing/guiding the glass panel 2 and secured to the frame 3 and based on at least one compatible thermoplastic elastomer (TPE) such as a thermoplastic vulcanizate (TPV) or a thermoplastic styrene (TPS) elastomer. According to the invention, this module 1 is obtained as a single piece by a single step of multiple-shot injection molding (typically two-shot injection molding in the case of two materials). To this end, the two materials respectively intended to form the frame 3 and to form the strip 4 and which are based on the aforementioned polymer and on the aforementioned thermoplastic elastomer are injected in succession into a mold of the moving platen, for example sliding platen, type or alternatively using transfer molding.

As illustrated in FIGS. 1 and 2, the frame 3 preferably has a hollow one-piece structure (i.e. is hollowed out at its center) over its entire length, comprising two substantially vertical portions, a front one 5 and a rear one 6, which are connected at their upper part by a substantially horizontal upper portion 7 and between which the glass panel 2 is mounted such that it can slide toward or away from this upper portion 7. The frame 3 according to the invention is fitted entirely from the inside of the glass panel 2, thus being completely invisible from the outside of the vehicle and thereby enhancing the esthetics thereof.

This hollowed-out structure of the frame 3, for example injection molded in a moving-platen mold, is obtained in particular by performing the following successive steps:

a) the thermoplastic material intended to form the frame 3 is injected into one cavity of the mold;

b) liquid water or a gas at a pressure and at a temperature lower than the temperature at which the thermoplastic material was injected is injected through and along the frame 3 thus injected into the mold, via the end 3*a* of the frame visible in FIG. 1, in order to form a hollow 3*b* at the center of this frame by peripheral compacting of the thermoplastic material (i.e. so that it is substantially annular in cross section); then c) the thermoplastic elastomer intended to form the weather strip/guide strip 4 is injected into another cavity of the mold.

The weather strip/guide strip 4 extends over the entire periphery of the frame 3, being secured to the latter as a result of the aforementioned two-shot injection molding, and this strip 4 has a continuous wiping lip 8 for wiping the glass panel 2 and a sealing lip 9 for sealing against the bodywork 10 of the vehicle, as illustrated in FIGS. 1 and 2.

The glass panel 2 is mounted in the frame 3 provided with the weather strip/guide strip 4 in the conventional way from underneath, from the inside of the frame 3.

Also by way of a preference and with reference to FIG. 3, the two-shot injection molding step involves forming a guide track 11, 12 for the sliding glass panel 2 in each of the front 5 and rear 6 portions and, after this molding step, runners 13 and 14 for guiding the glass panel 2 and which are bonded to an interior face of this glass panel are inserted into these two tracks 11 and 12 and mounted such that they can slide in the corresponding track 11, 12 so as to provide axially offset guidance (in the Y direction of the vehicle) of the glass panel 2 as it slides in the frame 3.

As illustrated in this FIG. 3 each guide track 11, 12 has, for example, a U-shaped cross section and each runner 13, 14 has a cross section substantially in the shape of an inverted U, one branch 13*a*, 14*a* of which is slideably mounted in the corresponding track 11, 12 and the other branch 13*b*, 14*b* of which is bonded via its external face to the glass panel 2. As a preference, at least two guide runners 13 or 14 are slideably mounted in one of these tracks 11 or 12 and at least one third runner 14 or 13 is slideably mounted in the other track 12 or 11 in order, through triangulation, to achieve stability upon guidance.

Each runner 13, 14 is advantageously made of an injection-molded plastic which may contain a strengthening filler, and may advantageously be provided with an anti-friction interface coating in the region thereof that is intended to slide in contact with the guide track 11, 12.

According to an important aspect of the present invention, it should be noted that these offset-guidance (i.e. non-linear guidance) means 13, 14 are designed so that the glass panel 2 does not come into contact with the wiping lip 8 as it slides toward the upper portion 7 of the frame 3 until it reaches the immediate vicinity of this upper portion 7 or butts against it, thus minimizing the resistance to abrasion of this wiping lip 8 and making the operation of sliding the glass panel 2 easier.

According to an additional aspect of the invention which is illustrated briefly in FIG. 4, the glass panel 2 may be mounted such that it can pivot about a longitudinal axis of the opening leaf (two positions of this same glass panel 2 following pivoting thereof are depicted in dotted line in FIG. 4), the lower base of this glass panel 2 being provided with a system of connection 15 to a glass panel lifter device 16 comprising two superposed mechanical links M and M' joined together by a flexible articulation A. The mechanical link M connects the glass panel 2 to a lower support (not illustrated) of the glass panel 2 by bonding or screw-fastening for example, and the other mechanical link M' connects the articulation A mounted under this glass panel support to the glass panel lifter device 16.

This glass panel lifter device 16 provided with such a connecting system 15 thus contributes toward the non-linear guidance according to the invention of the sliding glass panel 2 so that this glass panel does not come into contact with the wiping lip 8 until it comes into the immediate vicinity of or into contact with the upper portion 7 of the frame 3.

The invention claimed is:

1. Opening leaf upper module intended to be mounted at a the periphery of a glass panel of a vehicle, said module comprising a molded frame predominantly made of at least one thermoplastic polymer and a molded weather strip secured to said frame and predominantly made of at least one elastomer, wherein said module is molded by multiple-shot injection molding of materials of which said frame and said strip are formed, in which said elastomer is a thermoplastic elastomer compatible with said thermoplastic polymer, so as to obtain said module formed as a single piece and devoid of adhesive between said strip and said frame and wherein said frame has a longitudinal hollow giving to said frame a hollow structure over an entire length of said frame.

2. Opening leaf upper module according to claim 1, the module being designed to receive the glass panel so that the glass panel is movable in said frame, wherein said strip comprises a continuous wiping lip for wiping the glass panel, and an interface lip for interfacing with a bodywork of the vehicle to seal the opening leaf with respect to said bodywork.

3. Opening leaf upper module according to claim 1 and incorporating said glass panel, said frame having two substantially vertical portions, one front and one rear, which are joined together by a substantially horizontal upper portion and between which said glass panel is slidably mounted toward or away from said upper portion, wherein a guide track for guiding said glass panel is formed in each of said front and rear portions, and wherein glass panel guide means which are fixed to an interior face of said glass panel are slidably mounted in each of said guide tracks in order to provide axially offset guidance of said glass panel in said frame as it slides.

4. Opening leaf upper module according to claim 3, wherein each guide track has a U-shaped cross section, said glass panel guide means comprising shoes of substantially inverted U-shaped cross section with one branch slideably mounted in the corresponding guide track and an other branch bonded via its an external face of said another branch to the glass panel.

5. Opening leaf upper module according to claim 4, wherein said of said guide tracks and said glass panel guide means are configured so that the glass panel when sliding towards said upper portion of said frame does not come into contact with said wiping lip, until the glass panel it comes into an immediate vicinity of said upper portion or until the glass panel butts against said upper portion at an end of sliding of the glass panel.

6. Opening leaf upper module according to claim 1, wherein said weather strip has no reinforcing member.

7. Opening leaf upper module according to claim 1 and incorporating the glass panel, wherein said frame is entirely fitted from one and a same side of the glass panel that corresponds to an inside thereof so that said frame cannot be seen from an outside of the vehicle equipped with said module.

8. Opening leaf upper module according to claim 1, wherein said thermoplastic elastomer is chosen from the group consisting of thermoplastic vulcanizates and styrene block copolymers.

9. Opening leaf upper module according to claim 1, wherein said frame is predominantly made of an alloy of polyesters.

10. Opening leaf upper module according to claim 1, wherein the glass panel is mounted so that the glass panel can pivot about a longitudinal axis of the opening leaf upper module, a lower base of said glass panel being provided with a connecting system for connection to a glass panel lifter device comprising two superposed mechanical links joined together by a flexible articulation.

* * * * *

UNITED STATES PATENT AND TRADEMARK OFFICE

CERTIFICATE OF CORRECTION

PATENT NO. : 9,067,353 B2
APPLICATION NO. : 13/466761
DATED : June 30, 2015
INVENTOR(S) : Coldre et al.

It is certified that error appears in the above-identified patent and that said Letters Patent is hereby corrected as shown below:

In the claims:

Column 7,
Lines 24 and 25, "at a the periphery" should read --at a periphery--.

Column 8,
Line 14, "via its an external face" should read --via an external face--;
Line 20, "glass panel it comes" should read --glass panel comes--.

Signed and Sealed this
First Day of March, 2016

Michelle K. Lee
*Director of the United States Patent and Trademark Office*